United States Patent
Abdelhamed et al.

(10) Patent No.: US 12,106,524 B2
(45) Date of Patent: Oct. 1, 2024

(54) SYSTEM AND METHOD FOR LEARNING TONE CURVES FOR LOCAL IMAGE ENHANCEMENT

(71) Applicant: SAMSUNG ELECTRONICS CO., LTD., Suwon-si (KR)

(72) Inventors: Abdelrahman Abdelhamed, Toronto (CA); Luxi Zhao, Toronto (CA); Michael Scott Brown, Toronto (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 365 days.

(21) Appl. No.: 17/566,448

(22) Filed: Dec. 30, 2021

(65) Prior Publication Data

US 2023/0127327 A1    Apr. 27, 2023

Related U.S. Application Data

(60) Provisional application No. 63/270,817, filed on Oct. 22, 2021.

(51) Int. Cl.
| | | |
|---|---|---|
| G06T 7/90 | (2017.01) |
| G06T 5/20 | (2006.01) |
| G06T 5/94 | (2024.01) |
| G06T 7/11 | (2017.01) |
| G06T 11/00 | (2006.01) |
| G06V 10/56 | (2022.01) |

(52) U.S. Cl.
CPC .................. *G06T 7/90* (2017.01); *G06T 5/20* (2013.01); *G06T 5/94* (2024.01); *G06T 7/11* (2017.01); *G06T 11/001* (2013.01); *G06V 10/56* (2022.01); *G06T 2207/10024* (2013.01)

(58) Field of Classification Search
CPC .... G06T 7/90; G06T 5/20; G06T 5/94; G06T 7/11; G06T 11/001; G06T 2207/10024; G06T 5/60; G06T 2207/20084; G06V 10/56

See application file for complete search history.

(56) References Cited

U.S. PATENT DOCUMENTS

| | | |
|---|---|---|
| 9,292,911 B2 | 3/2016 | Paris et al. |
| 9,741,099 B2 | 8/2017 | Lim et al. |
| 10,504,452 B2 | 12/2019 | Chappalli et al. |
| 11,501,418 B2 | 11/2022 | Douady et al. |

(Continued)

FOREIGN PATENT DOCUMENTS

| | | |
|---|---|---|
| CN | 111784598 A | 10/2020 |
| JP | 2016-4313 A | 1/2016 |

OTHER PUBLICATIONS

Communication dated Jan. 20, 2023, issued by the International Searching Authority in counterpart International Application No. PCT/KR2022/015507 (PCT/ISA/210).

(Continued)

*Primary Examiner* — Andrae S Allison
(74) *Attorney, Agent, or Firm* — Sughrue Mion, PLLC

(57) ABSTRACT

A method is provided. The method includes receiving an input image, extracting at least one feature from the input image, determining at least one local tone curve for a portion of the input image based on the extracted at least one feature, the portion of the input image being less than an overall area of the input image, and generating a toned image based on the at least one local tone curve.

17 Claims, 19 Drawing Sheets

(56) References Cited

U.S. PATENT DOCUMENTS

| | | |
|---|---|---|
| 11,721,294 B2 | 8/2023 | Han et al. |
| 2004/0207734 A1* | 10/2004 | Horiuchi .............. H04N 23/741 |
| | | 348/229.1 |
| 2013/0322753 A1 | 12/2013 | Lim et al. |
| 2014/0223136 A1* | 8/2014 | Wu ..................... G06F 12/1009 |
| | | 711/206 |
| 2015/0071537 A1 | 3/2015 | Lim et al. |
| 2015/0245044 A1 | 8/2015 | Guo et al. |
| 2020/0172813 A1 | 6/2020 | Le Pendu et al. |
| 2020/0286213 A1* | 9/2020 | Unger .................. H04N 1/6027 |
| 2021/0133938 A1 | 5/2021 | Lee et al. |

OTHER PUBLICATIONS

Communication dated Jan. 20, 2023, issued by the International Searching Authority in counterpart International Application No. PCT/KR2022/015507 (PCT/ISA/237).

Na et al., "Data-driven Image Enhancement Using Deep Neural Networks for a Display Image Pipeline," SID Digest, pp. 961-964, 2019.

Zhao et al., "Learning Tone Curves for Local Image Enhancement," IEEE Access, vol. 10, p. 60099-60113, 2022.

* cited by examiner

SYSTEM AND METHOD FOR LEARNING TONE CURVES FOR LOCAL IMAGE ENHANCEMENT

CROSS-REFERENCE TO RELATED APPLICATION(S)

This application is based on and claims priority under 35 U.S.C. § 119 to U.S. Provisional Application No. 63/270,817, filed on Oct. 22, 2021, the disclosure of which is incorporated herein by reference in its entirety.

BACKGROUND

1. Field

The disclosure relates to a system, method and device for image enhancement.

2. Description of Related Art

Cameras typically utilize dedicated image signal processors (ISPs) to process a captured sensor image into the final output image. ISPs apply several steps in a pipeline fashion to process images. One of the operations is tone mapping. Tone mapping is one step in the photo enhancement stages of ISPs and has a major impact on the quality of the final image through enhancing the contrast and color tones of the image.

SUMMARY

In accordance with an aspect of the disclosure, a method may include receiving an input image, extracting at least one feature from the input image, determining at least one local tone curve for a portion of the input image based on the extracted at least one feature, the portion of the input image being less than an overall area of the input image, and generating a toned image based on the at least one local tone curve.

In accordance with an aspect of the disclosure, a system may include a memory storing instructions, and a processor configured to execute the instructions to receive an input image, extract at least one feature from the input image, determine at least one local tone curve for a portion of the input image based on the extracted at least one feature, the portion of the input image being less than an overall area of the input image, and generate a toned image based on the at least one local tone curve.

In accordance with an aspect of the disclosure, a non-transitory computer-readable storage medium may store instructions that, when executed by at least one processor, cause the at least one processor to receive an input image, extract at least one feature from the input image, determine at least one local tone curve for a portion of the input image based on the extracted at least one feature, the portion of the input image being less than an overall area of the input image, and generate a toned image based on the at least one local tone curve.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

The following detailed description of example embodiments refers to the accompanying drawings. The same reference numbers in different drawings may identify the same or similar elements.

Figure 1:
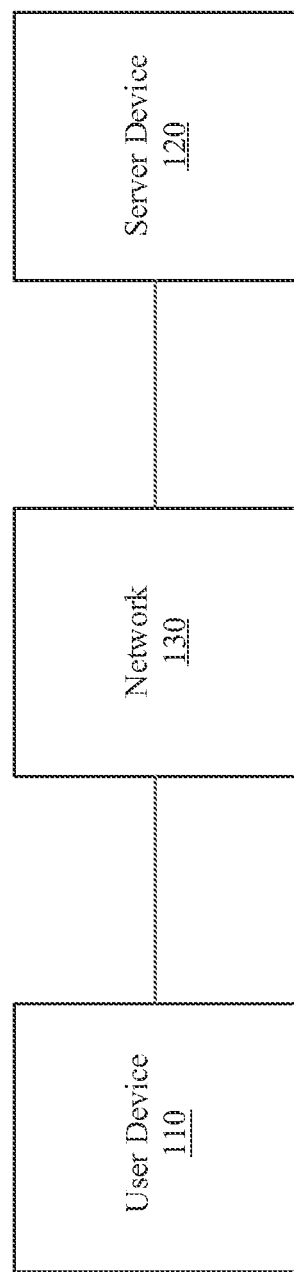
FIG. 1 is a diagram of devices of a system according to an embodiment.

FIG. 1 is a diagram of a system according to an embodiment. FIG. 1 includes a user device 110, a server device 120, and a network 130. The user device 110 and the server device 120 may interconnect via wired connections, wireless connections, or a combination of wired and wireless connections.

The user device 110 may include a computing device (e.g., a desktop computer, a laptop computer, a tablet computer, a handheld computer, a smart speaker, a server device, etc.), a mobile phone (e.g., a smart phone, a radiotelephone, etc.), a camera device, a wearable device (e.g., a pair of smart glasses or a smart watch), or a similar device.

The server device 120 includes one or more devices. For example, the server device 120 may be a server device, a computing device, or the like.

The network 130 includes one or more wired and/or wireless networks. For example, network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) may perform one or more functions described as being performed by another set of devices.

Figure 2:
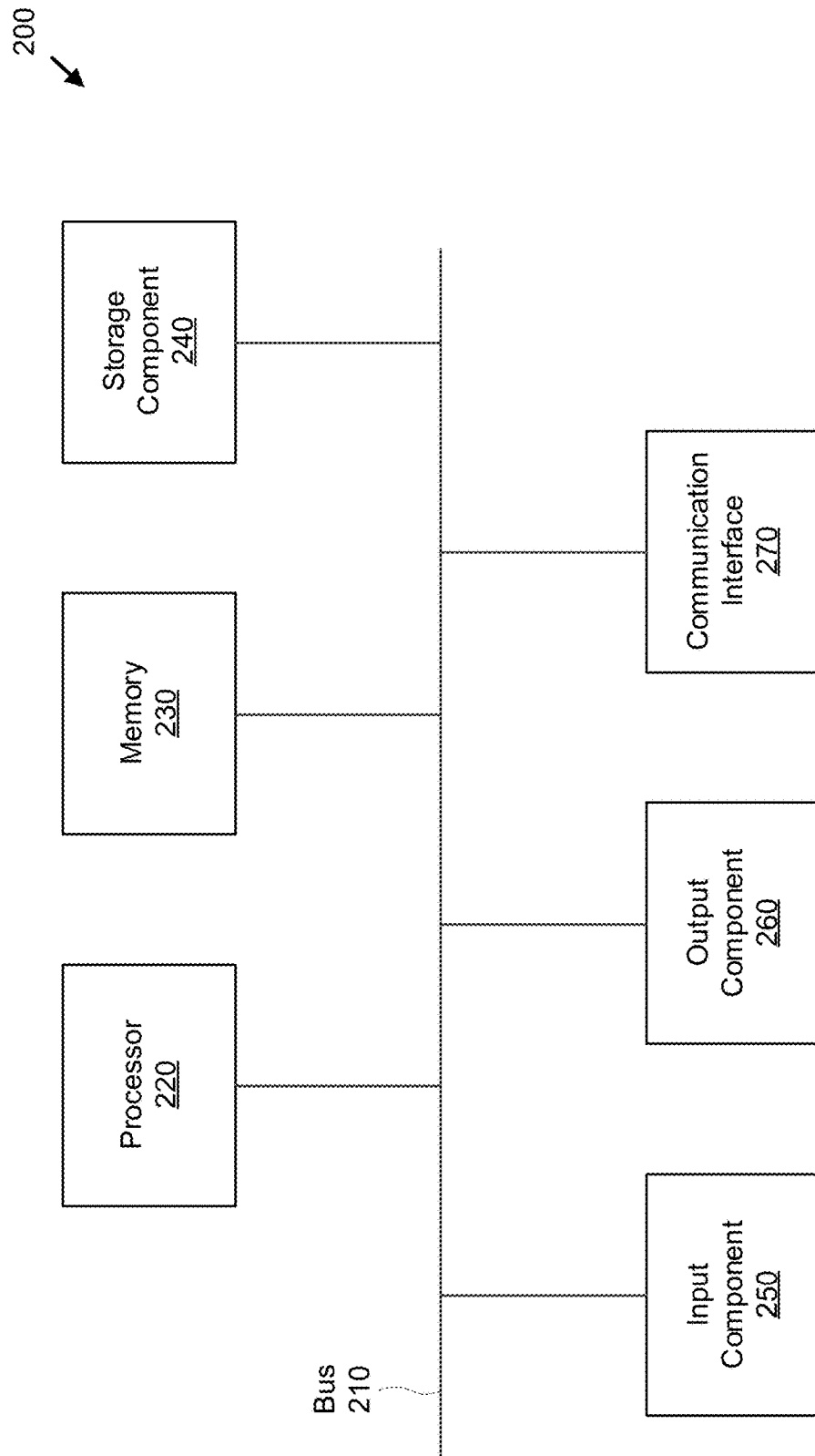
FIG. 2 is a diagram of components of the devices of FIG. 1 according to an embodiment.

FIG. 2 is a diagram of components of one or more devices of FIG. 1 according to an embodiment. Device 200 may correspond to the user device 110 and/or the server device 120.

As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor 220 includes one or more processors capable of being programmed to perform a function.

The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). The input component 250 may include a sensor for sensing information (e.g., a global positioning system (GPS) component, an accelerometer, a gyroscope, and/or an actuator).

The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform operations based on the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or storage component 240 may cause the processor 220 to perform one or more processes described herein.

Additionally, or alternatively, hardwired circuitry may be used in place of or in combination with software instructions to perform one or more processes described herein. Thus, embodiments described herein are not limited to any specific combination of hardware circuitry and software.

Figure 3:
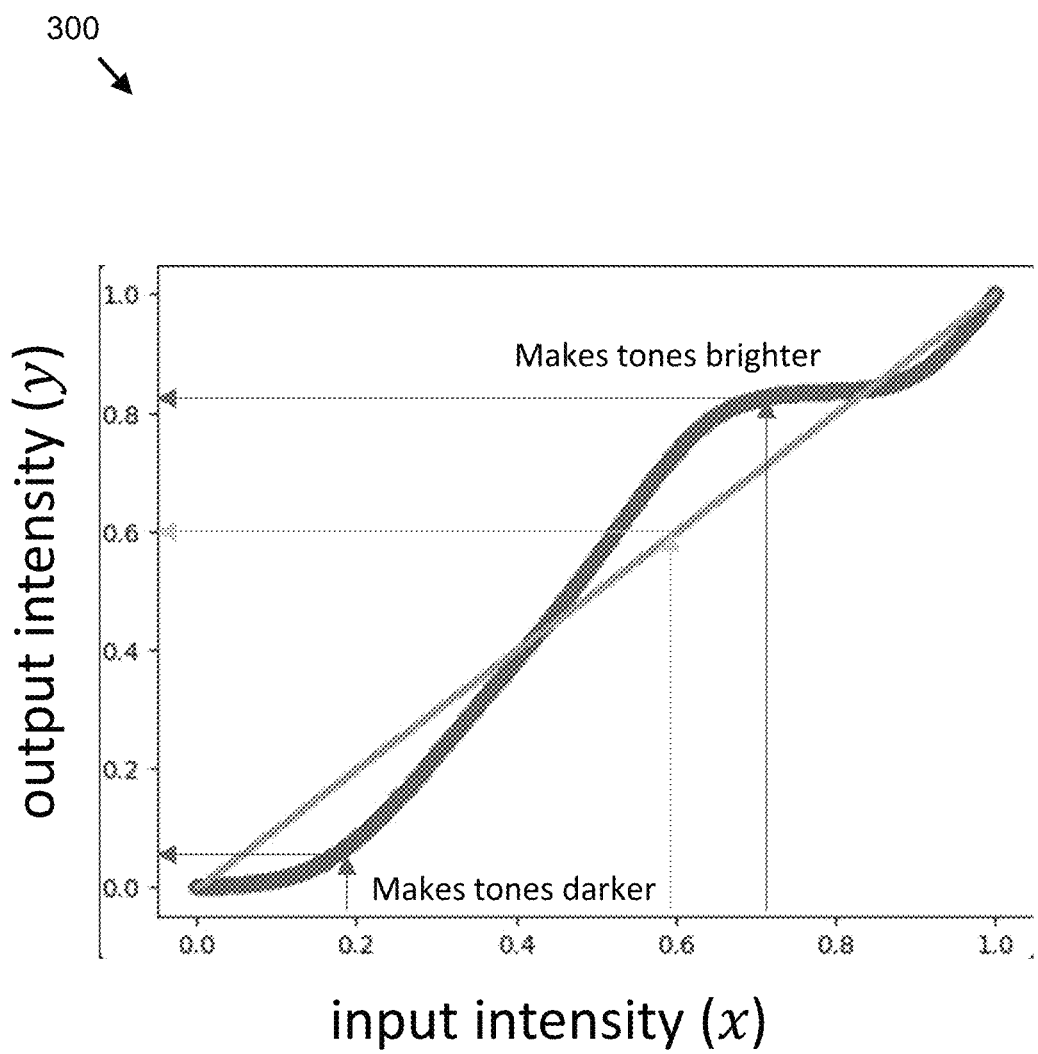
FIG. 3 is a diagram of a tone curve, according to an embodiment.

FIG. 3 is a diagram of a tone curve 300, according to an embodiment. The input intensity is measured on the horizontal axis, and the output intensity is measured on the vertical axis. A tone curve converts an input pixel intensity to a new output pixel intensity. The same tone curve may be applied to each RGB channel of a color image, or at least one of the RGB channels may have a tone curve specific to that channel. A tone curve may be referred to as a tone map, transfer function, tone operator, etc.

In global tone mapping (GTM), each pixel value is mapped to another value, regardless of the pixel position. GTM generally lacks flexibility, as local regions may be over-enhanced or under-enhanced. Local tone mapping (LTM) adjusts different image regions using different tone curves based on the image content. LTM offers more fine-grained control and allows for selective highlighting in images, and as explained below may apply constraints on aspects of the tone curve.

Provided herein are a system and method for learning local tone curves using neural networks. The method is based on tone mapping, outputting a series of tone curves instead of pixel-wise modifications. The tone curves are more intuitive for post-processing editing and for implementation in hardware. Furthermore, since the tone curves may be applied to images of any size, the system and method are not limited to a specific image resolution.

Figure 4A:
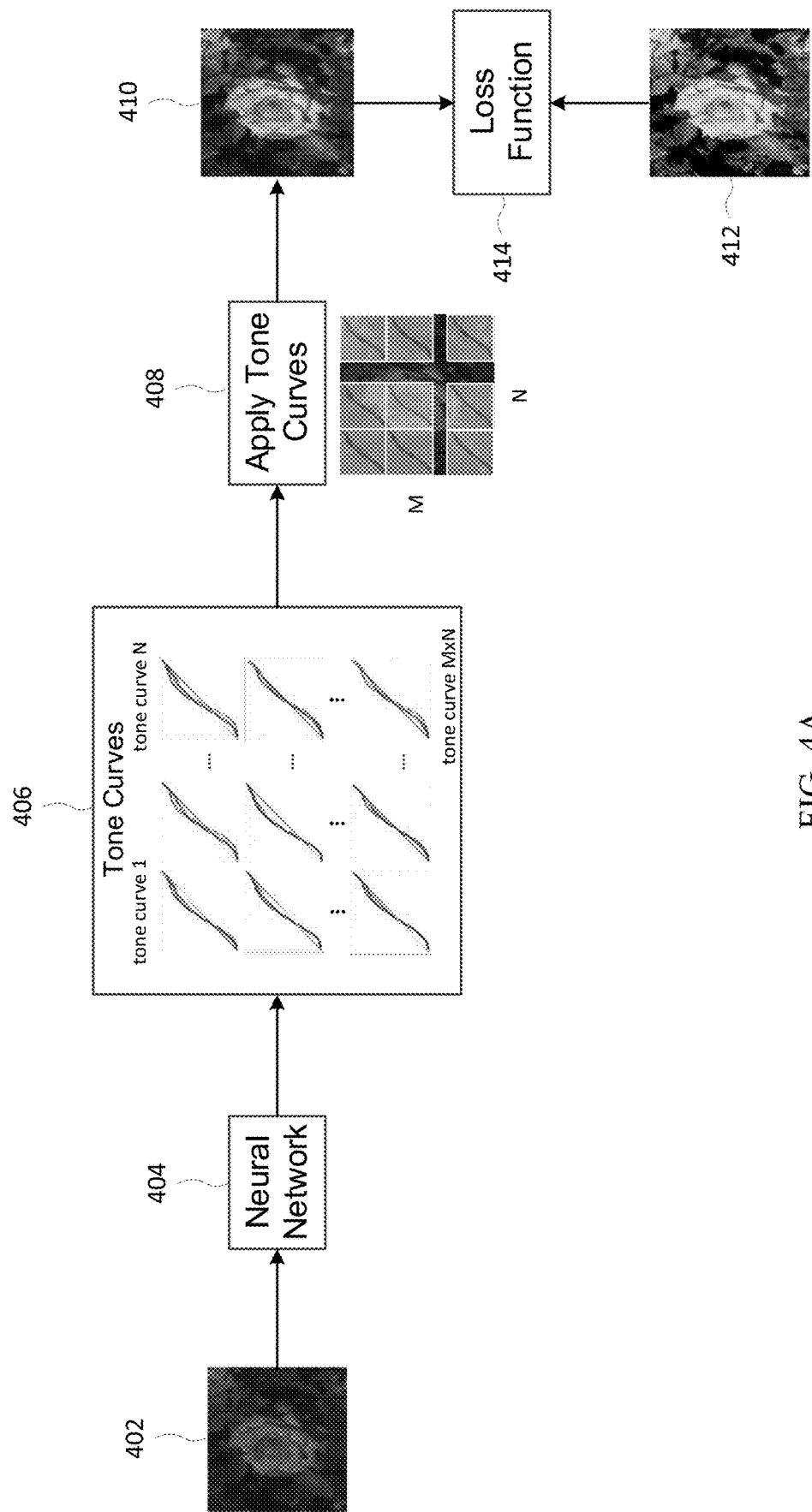
FIG. 4A is a diagram of a training process, according to an embodiment.

FIG. 4A is a diagram of a training process, according to an embodiment. The system receives a non-tone-mapped input image 402, which may be resized. The system extracts features from the input image 402 and determines M×N local tone curves 406 using the neural network 404 (where M and N represent the grid size in M rows and N columns used to divide the image into patches or tiles, where M is the number of tiles or patches along the vertical direction and N is the number of tiles or patches along the horizontal direction (or along any two suitable axes in the plane of the image). In particular embodiments, network 404 determines a tone curve (in particular embodiments, 3 tone curves, 1 for each R, G, and B channel) for each tile or patch in the M×N grid. Each tone curve may include three one-dimensional lookup tables (LUTs), one for each RGB channel. The tone curves 406 may be constrained to be non-decreasing. The system then applies the tone curves to the input image and interpolates the image, as shown in block 408. The system then generates a locally tone-mapped image 410. Using the ground-truth image 412 (e.g., a photographer edited image), the system determines the loss with a loss function 414 based on the generated locally tone-mapped image 410 and the ground-truth image 412 to train the neural network.

Figure 4B:
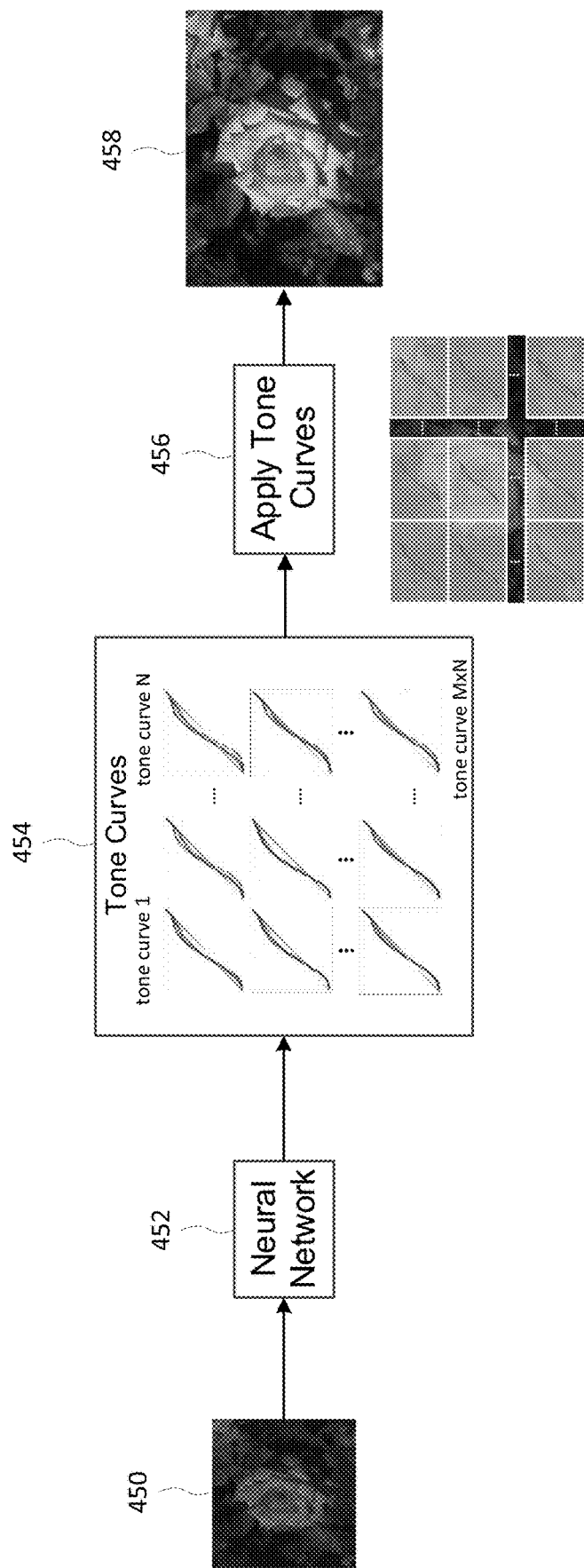
FIG. 4B is a diagram of an inference process, according to an embodiment.

FIG. 4B is a diagram of an inference process, according to an embodiment. The system receives a resized non-tone-mapped image input 450. The system then extracts features and determines M×N local tone curves 454 using the neural network 452. The system then applies the tone curves to the full resolution version of the input image 450, as shown in block 456. The system then generates the locally tone-mapped full resolution image 458.

Figure 5:
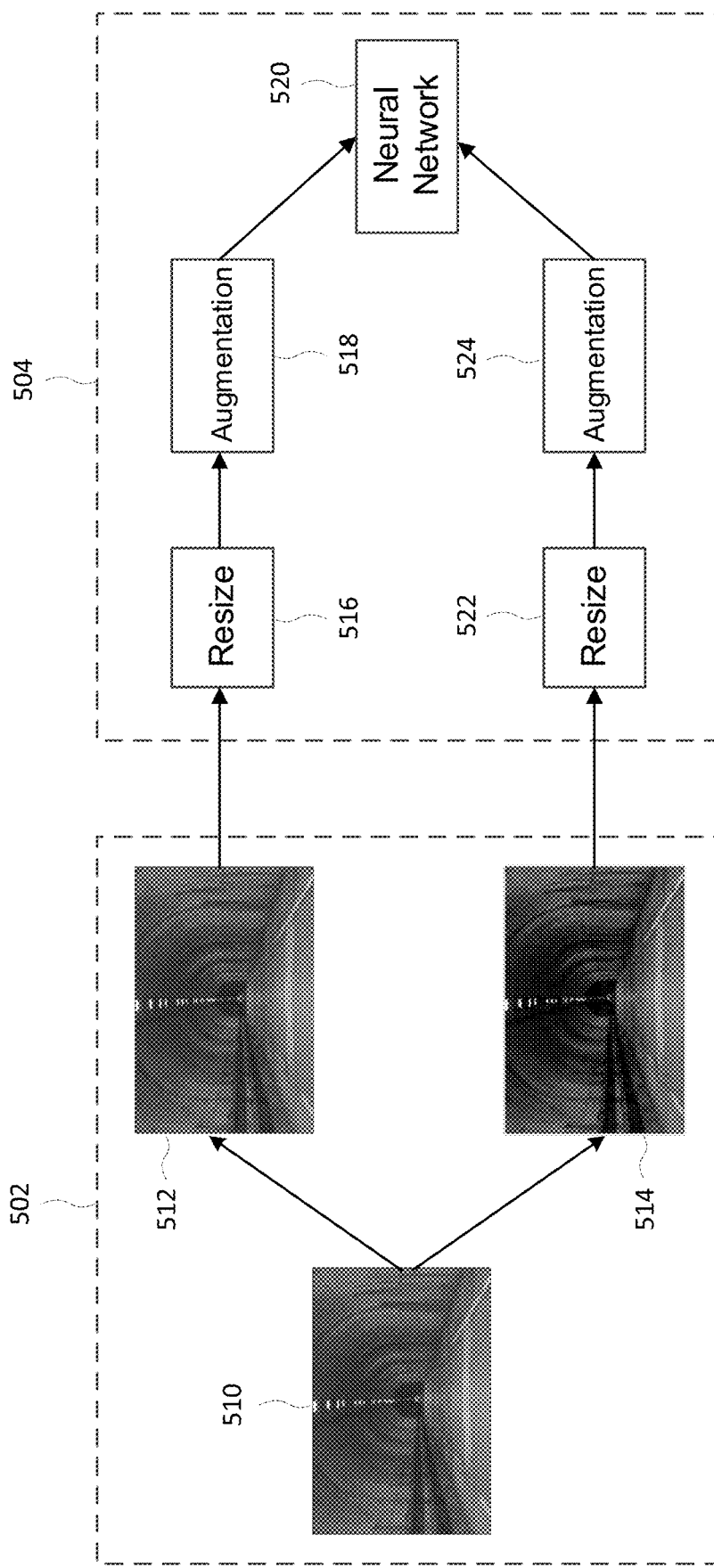
FIG. 5 is a diagram of data pre-processing, according to an embodiment.

FIG. 5 is a diagram of data pre-processing, according to an embodiment. For lightroom processing 502, an original raw image 510 is processed by an ISP to generate a white balanced full resolution image 512, and the image 510 is processed by an editor to generate the full resolution image 514. The image 512 may be used as an input image shown in FIGS. 4A and 4B above, and the image 514 may be used as a basis for a ground-truth image. For training 504, the image 512 may be resized at block 516, augmented (i.e., flipped) at block 518 and provided to the neural network 520. Furthermore, image 514 may be resized at block 522, augmented (i.e., flipped) at block 524 and provided to the neural network 520. The image 512 may also be passed to the neural network 520 before the resizing and augmentation. The augmentation may be used to assist the neural network 520 to generalize images of different orientations. The resizing may be performed such that the image 512 and the image 514 are the same resolution for feature extraction.

Figure 6:
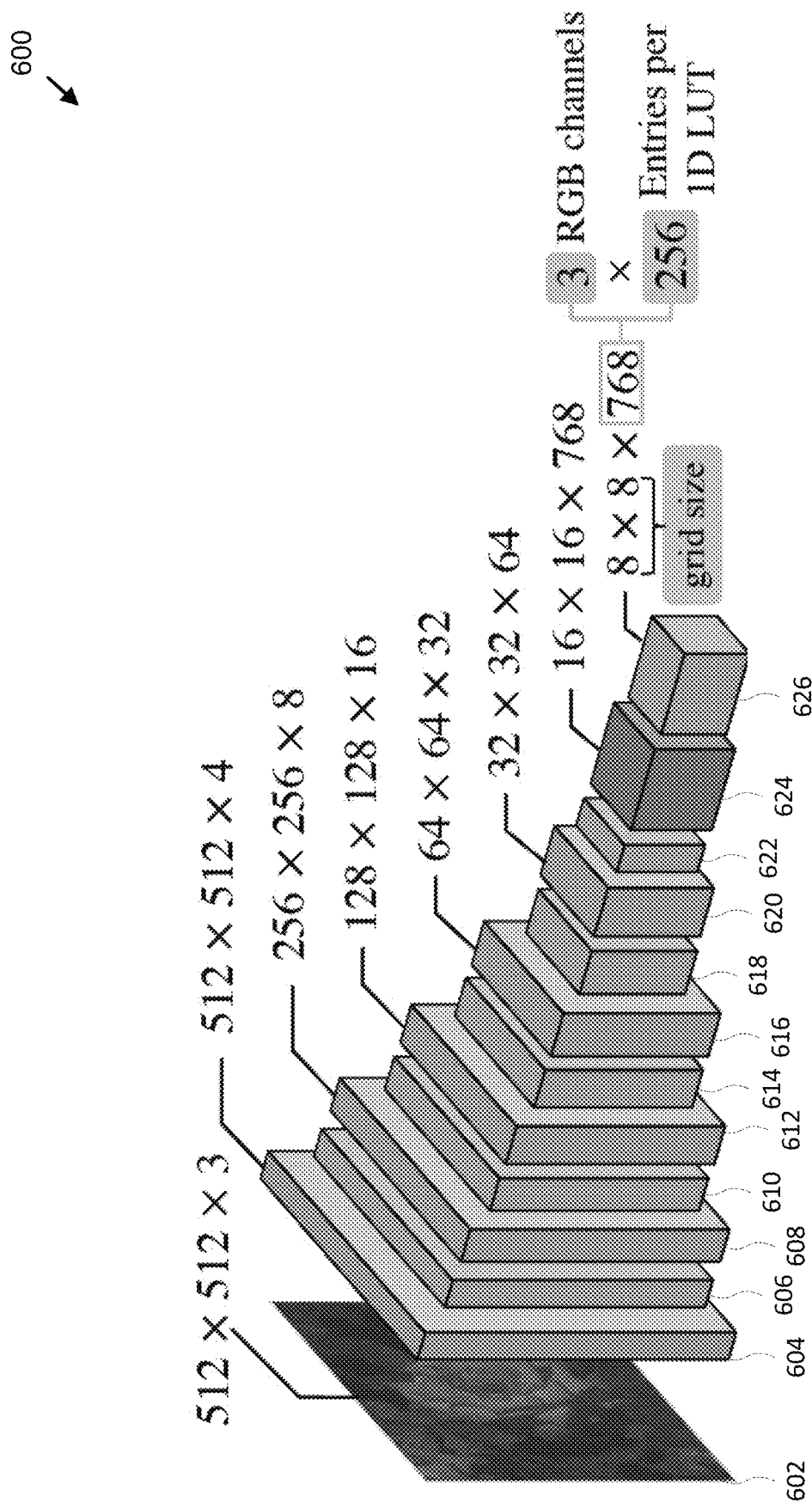
FIG. 6 is a diagram of a neural network architecture, according to an embodiment.

FIG. 6 is a diagram of a neural network architecture, according to an embodiment. An input image 602 is input to the network 600 of a size 512×512×3 (i.e., pixel length× pixel height×number of channels). The system then processes the input image 602 through various layers of the network 600. In one embodiment, the first layer 604 may include a convolutional plus non-linear activation (e.g., rectified linear unit ReLU) layer that produces an output feature map of size 512×512×4. The second layer 606 may include a max pooling layer with an output shape of 256× 256×4. The third layer 608 may include a convolutional plus non-linear activation layer with an output shape of 256× 256×8. The fourth layer 610 may include a max pooling layer with an output shape of 128×128×8. The fifth layer 612 may include a convolutional plus non-linear activation layer with an output shape of 128×128×16. The sixth layer 614 may include a max pooling layer with an output shape of 64×64×16. The seventh layer 616 may include a convolutional plus non-linear activation layer with an output shape of 64×64×32. The eighth layer 618 may include a max pooling layer that with an output shape of 32×32×32. The ninth layer 620 may include a convolutional plus non-linear activation layer with an output shape of 32×32×64. The tenth layer 622 may include a max pooling layer with an output shape of 16×16×64. The eleventh layer 624 may include a convolutional plus sigmoid layer with an output shape of 16×16×768. The twelfth layer 626 may include a max pooling layer with an output shape of 8×8×768. The 8×8 size represents the final grid size for the number of tone curves (e.g., M×N). The 768 channels represent the 3 RGB channels multiplied by 256 entries in the one-dimensional LUT. The number of layers in the network 600 may be adjusted such that the output shape is consistent with the shape of the predicted tone curves. The tone curves may be constrained to be non-decreasing, to take on values between 0 and 1, and to be smooth.

The layers of the network 600 may be used for feature extraction and tone curve prediction. For feature extraction, the system may utilize architectures where the receptive fields of the output neurons making the tone curves cover the image portions on which they are applied. A tone curve prediction head may be stacked on top of the feature extraction layers to ensure that tone curve entries are in the desired shape and range.

The output of the network 600, $\mathcal{T}$, may represent a set of transfer functions (i.e., tone curves) that are applied to the input image 602 to adjust its local contrast, brightness, and colors. The network 600 may predict a number of tone curves or one-dimensional LUTs for each image portion in an M×N grid. For a standard RGB (sRGB), three one-dimensional LUTs may be predicted for each portion, one for each R, G and B channel, as in Equation (1):

$$\mathcal{T} = \{t_{m,n,c}\} \qquad (1)$$

where $m \in \{0, \ldots, M-1\}$, $n \in \{0, \ldots, n-1\}$, and $c \in \{0, 1, 2\}$. Therefore, the system may predict M×N×3 tone curves in total. Each tone curve may be represented by a one-dimensional LUT that has L entries ($t \in \mathbb{R}^L$). Each entry maps an input pixel intensity to an output enhanced intensity.

The application of the predicted local tone curves on the input image 602 may be performed using bilinear interpolation between each set of local tone curves in order to produce a smooth and artifact-free locally tone-mapped image $\hat{y} = \mathbb{R}^{H \times W \times C}$, as in Equation (2).

$$\hat{y} = \text{Interp}(x, \mathcal{T}) \qquad (2)$$

A predicted tone curve may be most appropriate for the center pixel of each portion in the M×N grid. All other pixels in the portion may be influenced by the tone curves of neighboring portions by varying degrees, according to the distance of the pixel to the neighboring portion centers. Thus, the tone curve for each pixel smoothly transitions to another, resulting in a continuous output image substantially free of boundary artifacts, as is described below.

The system may transform all non-center pixels by a combination of neighboring tone curves whose portion centers are closest. Pixels in the center region of the image may be bilinearly interpolated, combining the influence of the two neighboring tone curves. Pixels at the border region of the image may be linearly interpolated, combining the influence of the two neighboring tone curves. Pixels at the four corners of the image may not be interpolated, as these pixels may be influenced by the tone curves of their own portion only.

Figure 7:
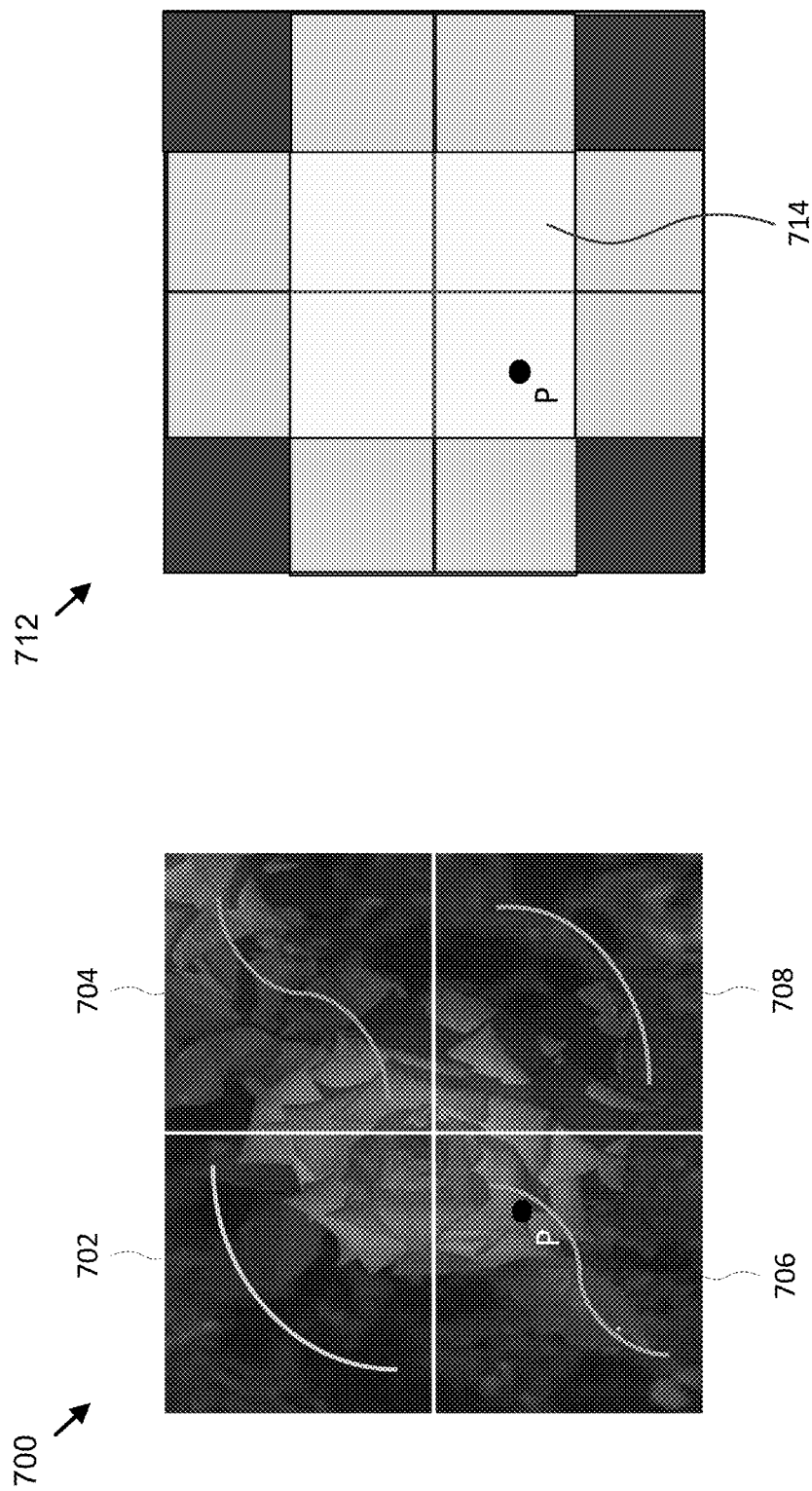
FIGS. 7, 8, 9, 10 and 11 are diagrams of tile-based interpolation, according to an embodiment.
Figure 8:
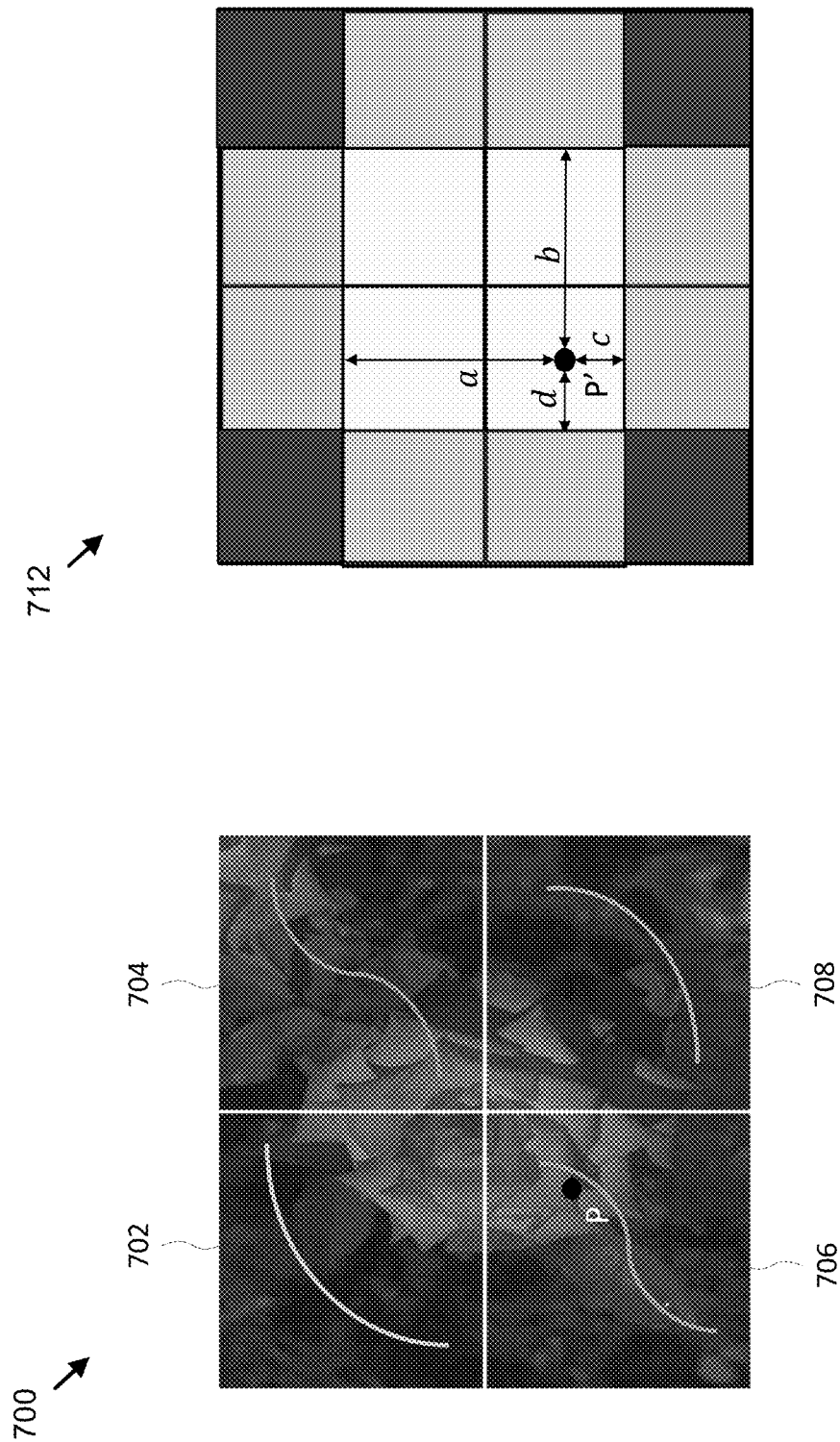

FIGS. 7, 8, 9, 10 and 11 are diagrams of tile-based interpolation, according to an embodiment. FIG. 7 includes a picture gird 700 and a region grid 712. Referring to FIG. 7, the picture grid 700 includes four tiles, tile 702, tile 704, tile 706 and tile 708. The system may predict a tone curve for each tile using the neural network. Based on the location of pixel P being in the center region 714, the system may apply the tone curves for each of the tiles 702-708 to the center region 714, thereby creating four tone-mapped versions of the center region 714. Referring to FIG. 8, point P' may be determined as in Equation (3):

$$P' = \frac{bcP_1 + dcP_2 + abP_3 + adP_4}{(a+c)(b+d)} \quad (3)$$

where $P_1$, $P_2$, $P_3$, and $P_4$, represent the point P transformed by the four tone curves corresponding to the four tiles, tile 702, tile 704, tile 706 and tile 708, respectively. P' may represent a weighted average of $P_1$, $P_2$, $P_3$, and $P_4$, (i.e., P' is the result of P being transformed by a new tone curve that combines the influence of the four tone curves of the tiles 702-708). Every point P' in the center region 714 of the output image is the interpolation of $P_1$, $P_2$, $P_3$, and $P_4$, weighted by the distance to each tile center. Since the center region includes a portion of each tile 702-708, each of the respective tone curves are applied to the center region. While the example above involves four image tile and corresponding tone curves and 16 regions, this disclosure contemplates that interpolation may involve any suitable number of image tiles and regions.

Figure 9:
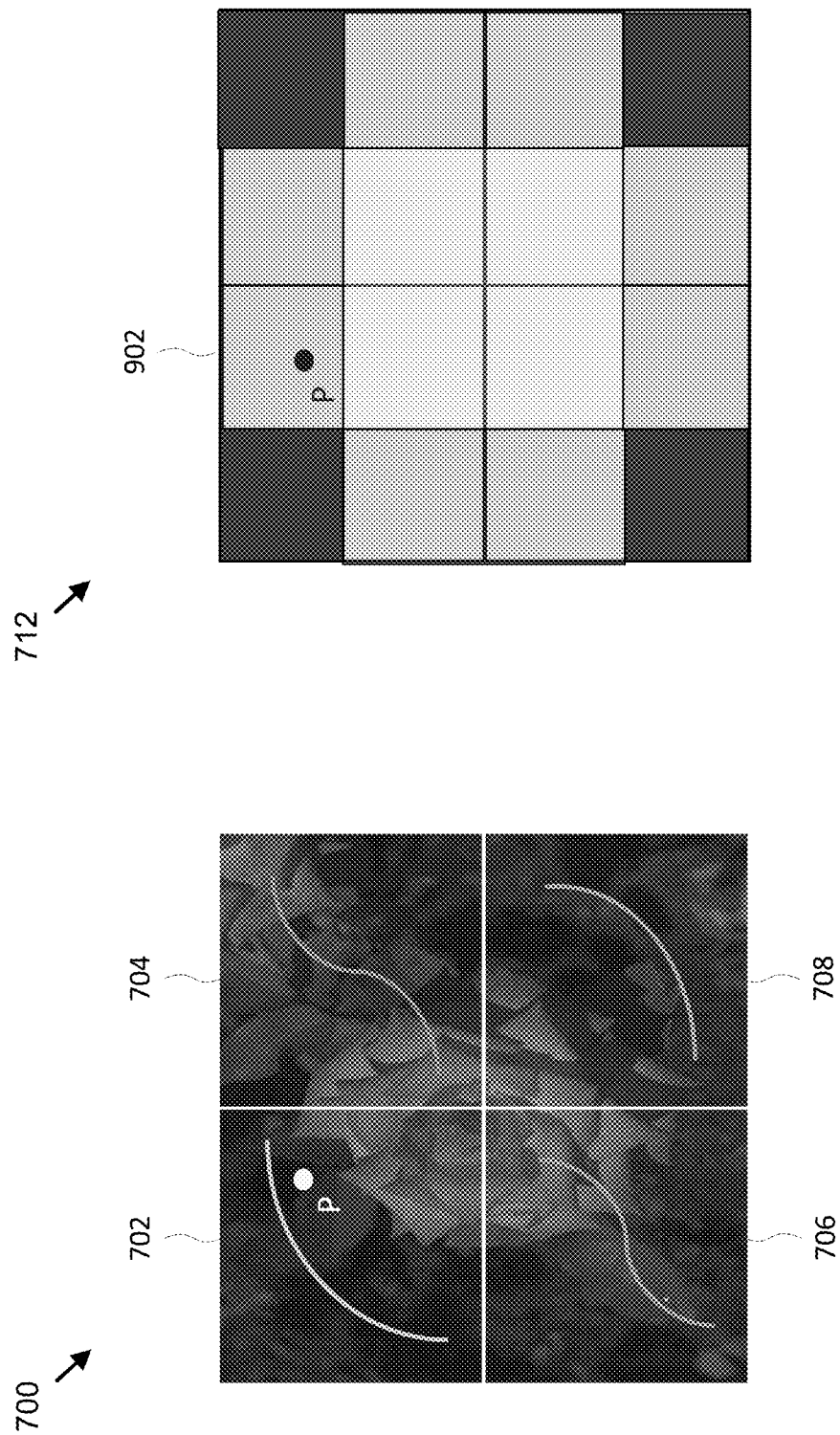
Figure 10:
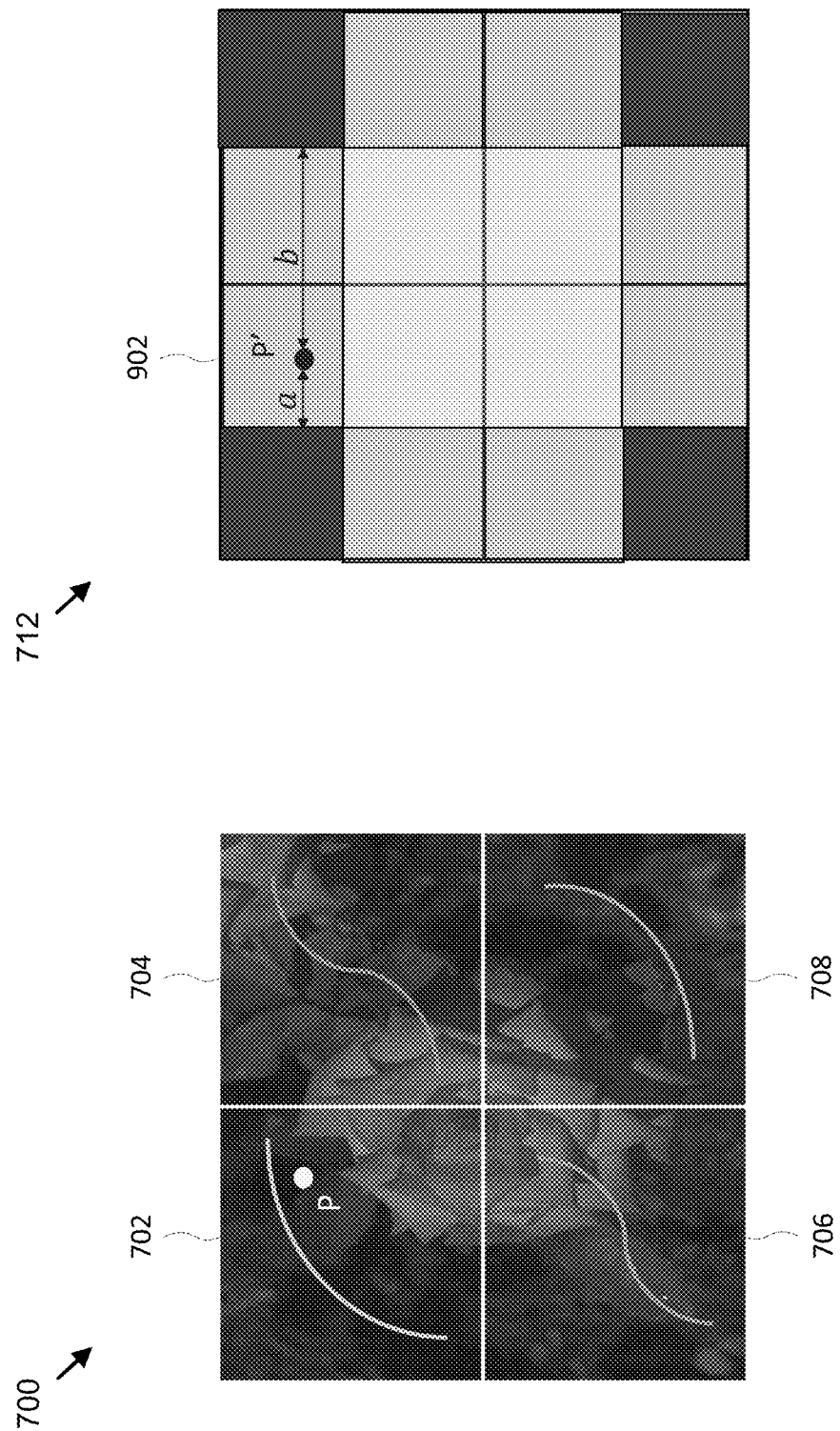

Referring to FIG. 9, for a pixel P located in the border region 902, the system may apply the tone curve of tile 702 and the tone curve of tile 704 to the border region 902, as pixel P is located in tile 702 and borders tile 704. Referring to FIG. 10, P' may be determined as in Equation (4):

$$P' = \frac{bP_1 + aP_2}{a+b} \quad (4)$$

Every point P in the border region 902 is a linear interpolation of $P_1$ and $P_2$, and is weighted by the distance to each tile center.

Figure 11:
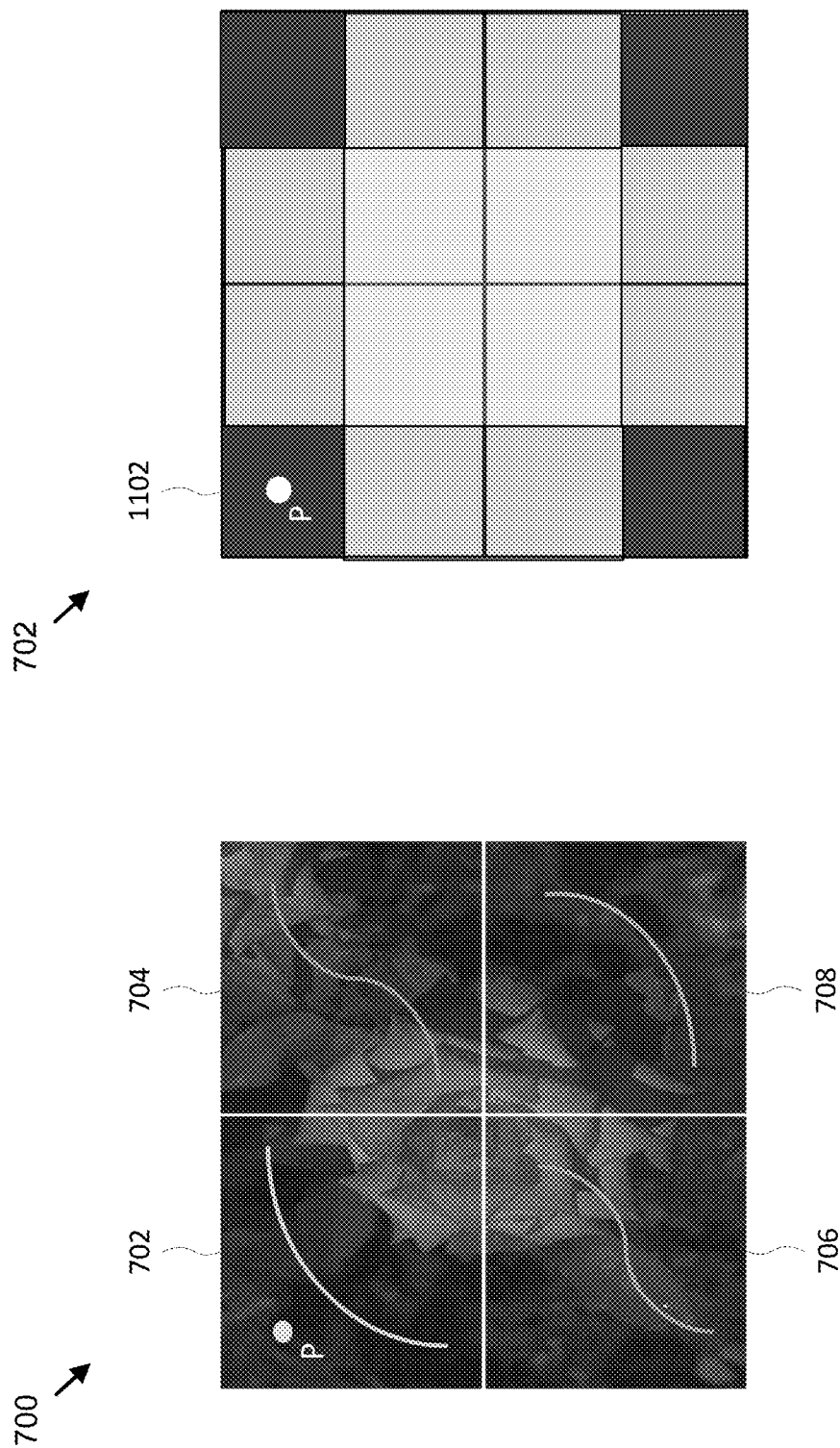

Referring to FIG. 11, the pixel P is located in corner region 1102. The system may apply the tone curve of each tile to their respective corner regions, as no interpolation may be performed for pixels in corner regions (e.g., the pixels are not in regions that border other regions of other tiles).

Figure 12:
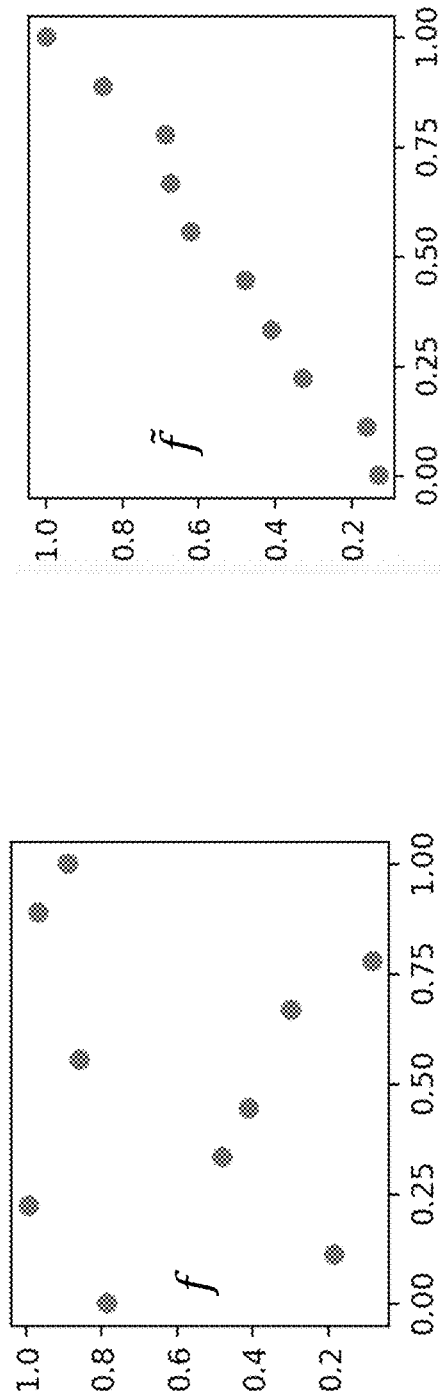
FIG. 12 is a diagram of graphs showing tone curve constraints, according to an embodiment.

FIG. 12 is a diagram of graphs showing tone curve constraints, according to an embodiment. The tone curves may be constrained according to Equation (5):

$$t_l = \frac{1}{\sum_{k=0}^{L-1} \hat{t}_i} \sum_{k=0}^{l} \hat{t}_i \quad (5)$$

where L is the number of control points, $l \in [0, L-1]$, $\hat{t}_0 \ldots \hat{t}_{L-1} \in [0, 1]$ (tone curve values predicted by the neural network), and $t_0 \ldots t_{L-1} \in [0, 1]$ (tone curve values with non-decreasing constraint enforced). $t_l$ is the cumulative sum of all previous points $t_0 \ldots t_l$. Graph 1202 shows non-constrained tone curve points, and graph 1204 shows the tone curve points constrained according to Equation (5).

The L1 loss function may be determined as in Equation (6):

$$\frac{1}{n}\sum_{i=1}^{n}|y_i - \hat{y}_i| \quad (6)$$

where n is the total number of pixels, $y_i$ is pixel i of the ground-truth image, and $\hat{y}_i$ is pixel i of the predicted image. The cosine loss may minimize the angle between RGB vectors for better super vision on colors, and may be determined as in Equations (7) and (8):

$$\theta_i = \frac{\cos^{-1}\left(\frac{y_i \cdot \hat{y}_i}{\|y_i\|\|\hat{y}_i\|}\right)}{\pi} \quad (7)$$

$$loss = \frac{1}{n}\sum_{i=1}^{n}\theta_i \quad (8)$$

where n is the total number of pixels, $y_i$ is pixel i (an [R, G, B] vector) of the ground-truth image, $\hat{y}_i$ is pixel i (an [R, G, B] vector) of the predicted image, and $\theta_i$ is the angle between $y_i$, and $\hat{y}_i$, normalized to [0, 1].

Figure 13:
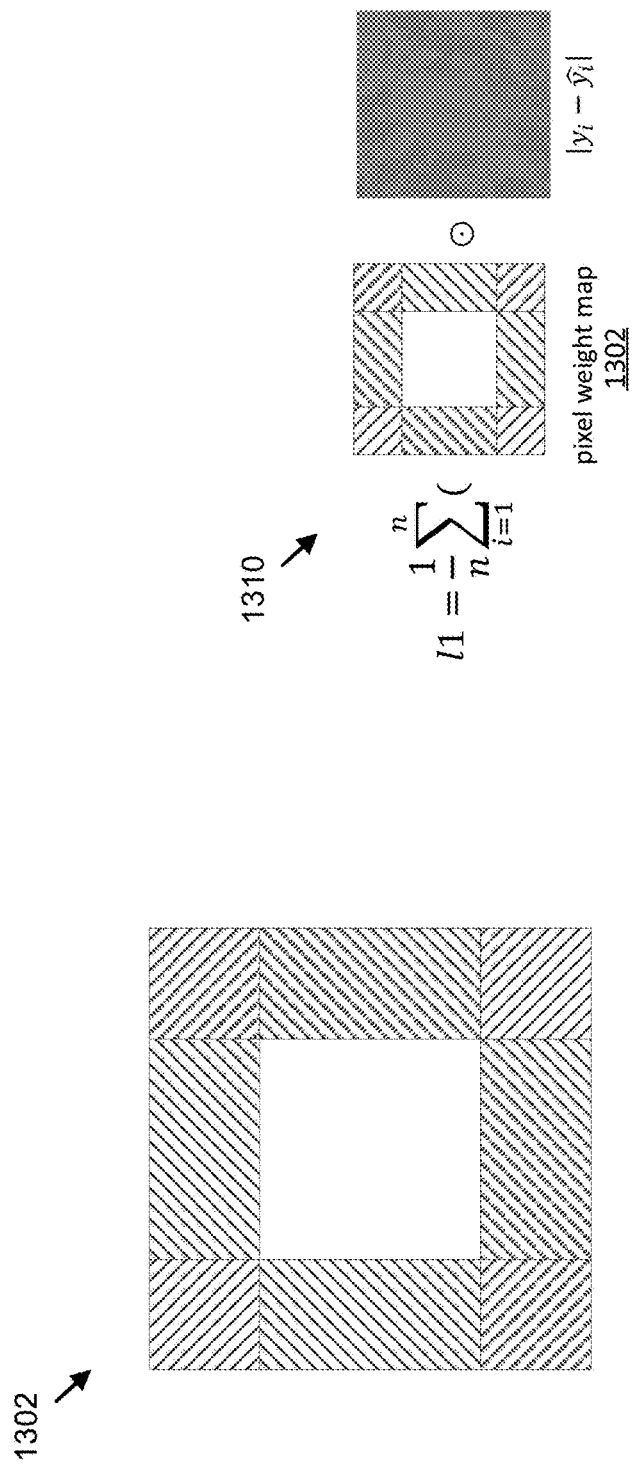
FIG. 13 is a diagram of a pixel weight map, according to an embodiment.

FIG. 13 is a diagram of a pixel weight map, according to an embodiment. The pixel weight map 1302 includes corner regions 1304, border regions 1306, and a center region 1308. The pixels at the border may be weighted more heavily in the L1 loss to provide more supervision on boundary tone curves, as shown in the loss generated in Equation 1310 (e.g., the loss generated based on applying the weight map 1302). In Equation 1310, the weighted L1 loss is obtained by elementwise multiplying the pixel weight map 1302 and the L1 difference between the ground truth image and the predicted image. For example, pixels in the center regions may be weighted to ¼, pixels in the border regions may be weighted to ⅓, and pixels in the corner region may be weighted to 1/2.25. While the example of FIG. 13 illustrates a mask having a particular number of regions having square or rectangular shapes of particular sizes, this disclosure contemplates that a mask may contain any suitable number of regions having any suitable shape and size.

Figure 14:
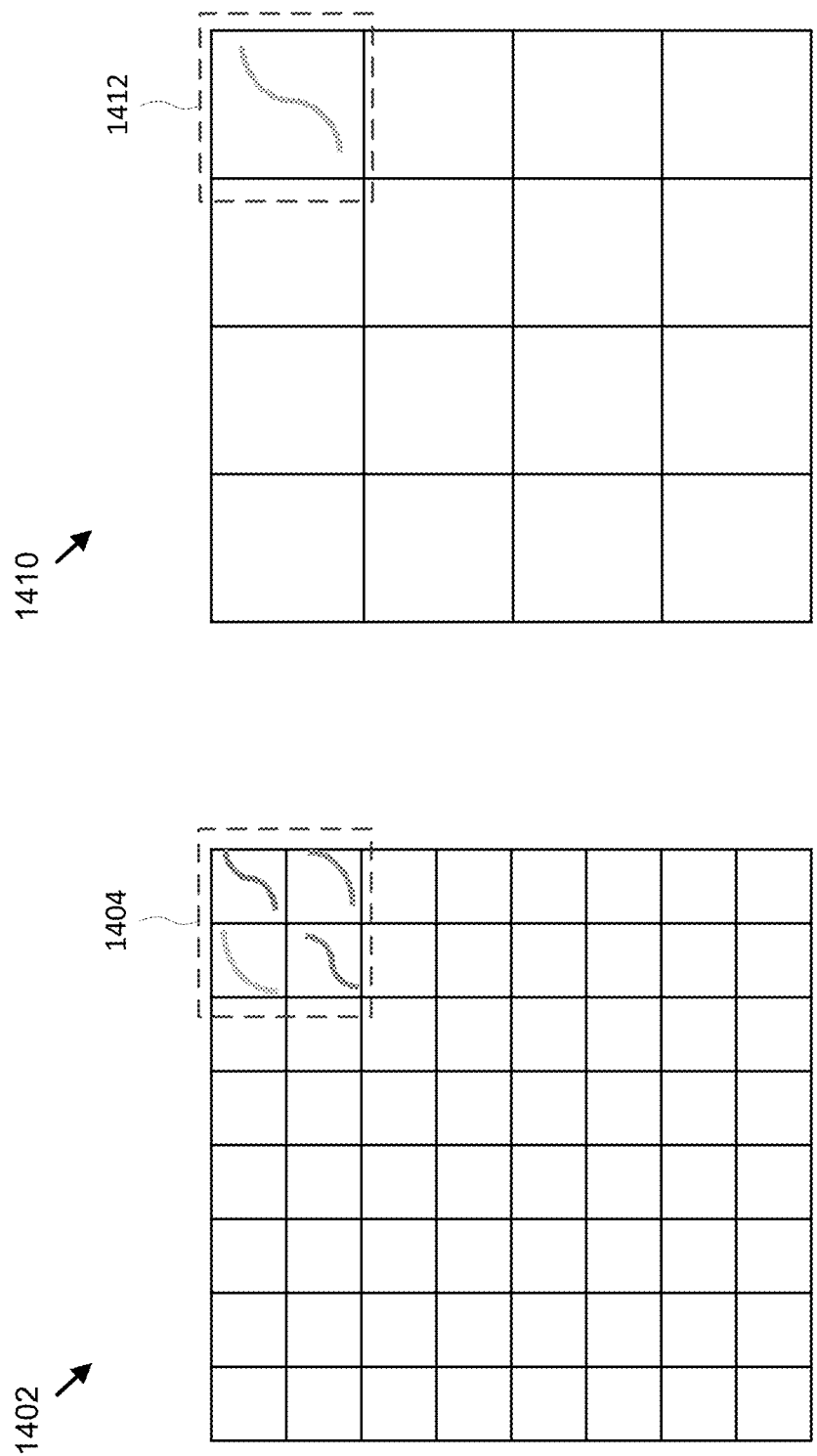
FIG. 14 is a diagram of an example of averaging tone curves, according to an embodiment.

FIG. 14 is a diagram of an example of averaging tone curves, according to an embodiment. During inference, if a smaller grid size is needed (e.g., the system has limited resources or the input image has large homogeneous regions), tone curves can be averaged to produce a smaller grid. For example, the larger grid 1402 may include a region 1404 including four tiles and four tone curves. If a smaller grid is needed for inference, the tone curves may be averaged to provide the smaller grid 1410. Thus, the tone curves in region 1404 can be averaged to produce a single tone curve for region 1412. The averaged tone curve shown in region 1412 is presented for illustration purposes and the actual linear average of the four tone curves in region 1404 may be different from the example averaged tone curve depicted.

As described above, one example utilizes LTM only to enhance images. However, LTM and GTM may be used in combination without departing from the scope of the disclosure herein.

Figure 15:
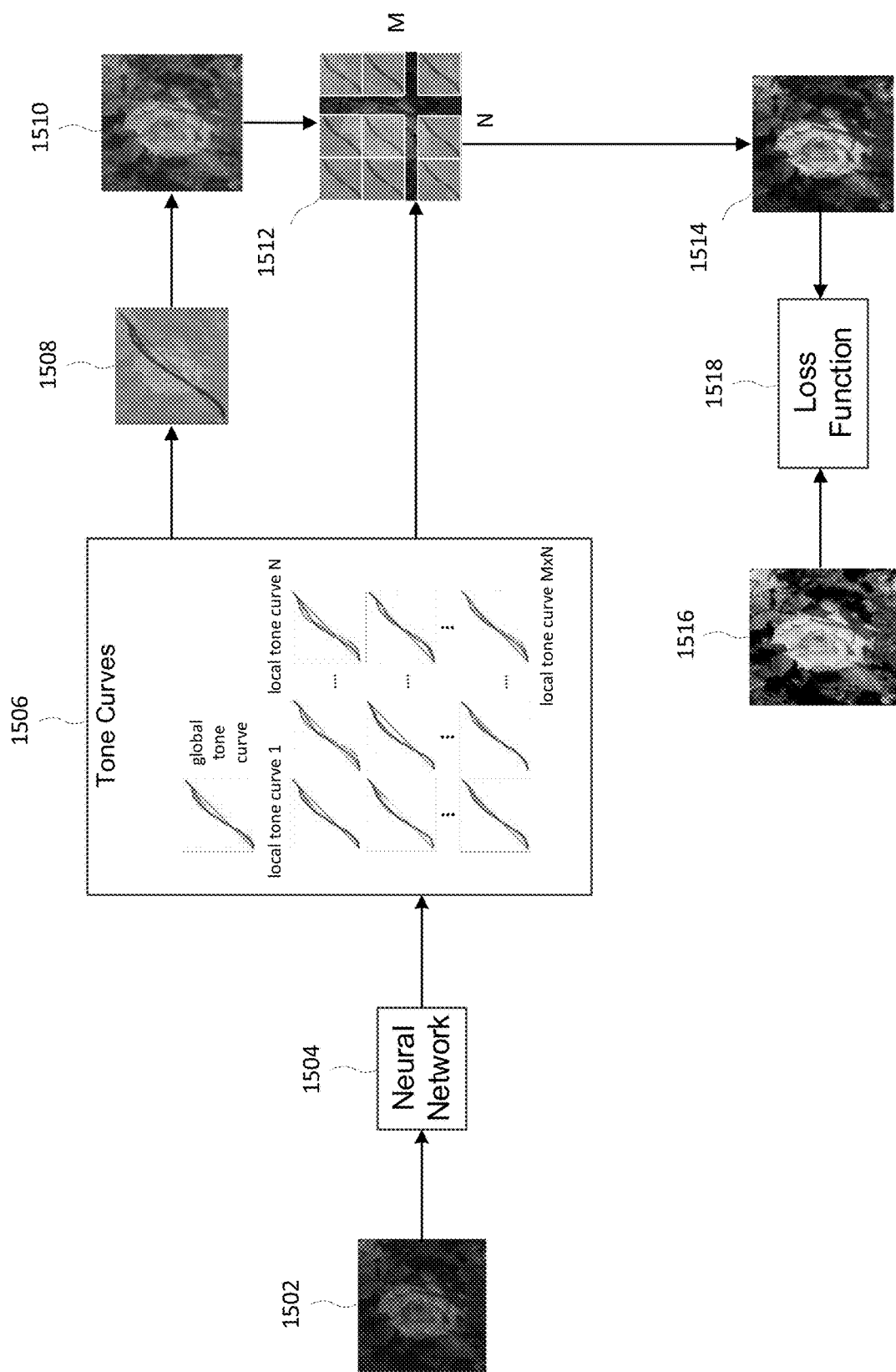
FIG. 15 is a diagram of an image enhancement process, according to an embodiment.

FIG. 15 is a diagram of an image enhancement process, according to an embodiment. The system receives a non-tone-mapped input image 1502. The system extracts features from the image 1502 and determine a global tone curve as well as local tone curves as shown in 1506 using the neural network 1504. At block 1508, the system applies the global tone curve to the image 1502 to provide the globally tone-mapped image 1510. At block 1512, the system applies the local tone curves to the image 1510 to produce the locally tone-mapped image 1514. The system generates a loss function 1518 based on the image 1514 and a ground-truth image 1516. Alternatively, the system may apply the local tone curves first, and then apply a global tone curve.

Figure 16:
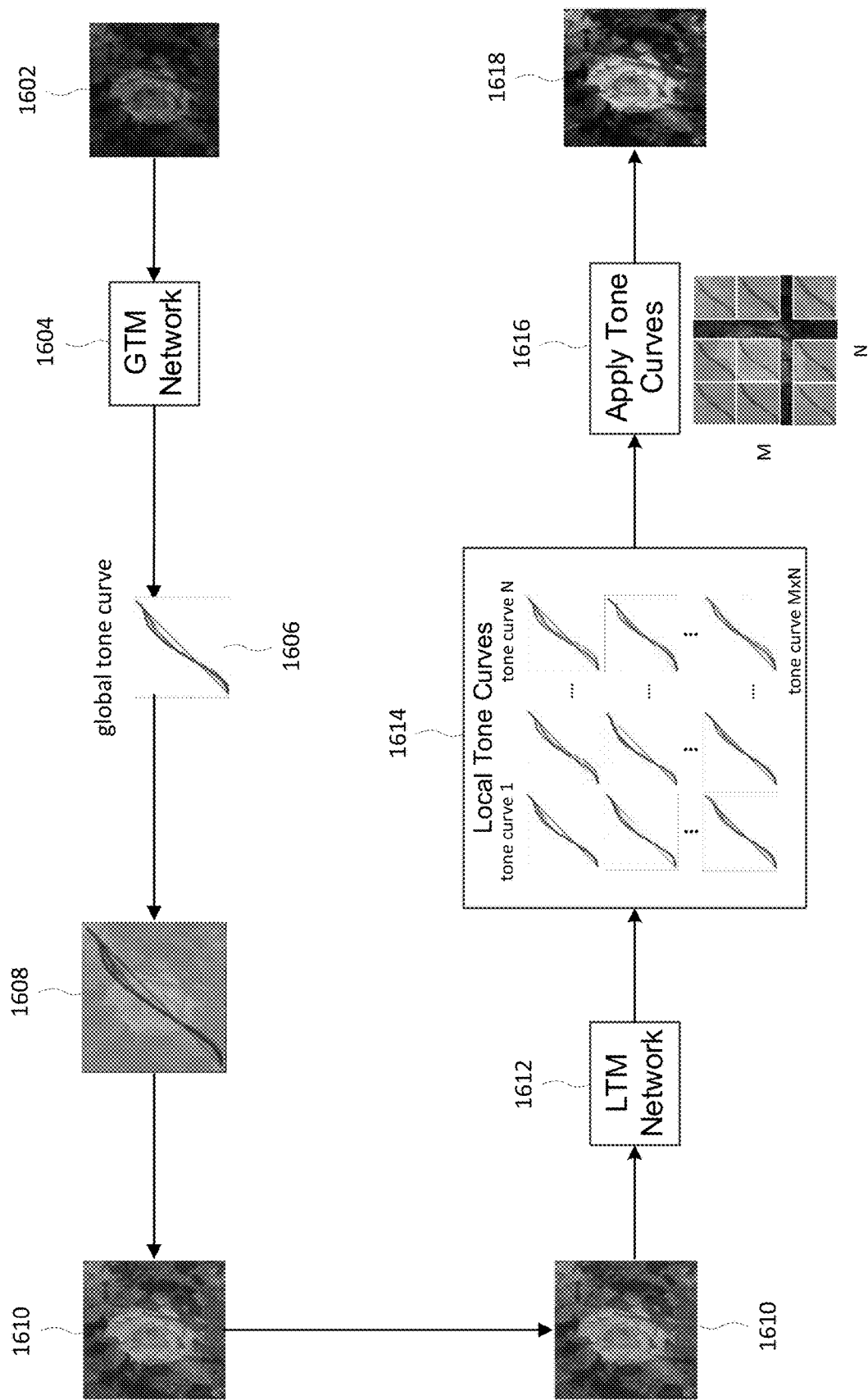
FIG. 16 is a diagram of an image enhancement process, according to an embodiment.

FIG. 16 is a diagram of an image enhancement process, according to an embodiment. The system receives a non-tone-mapped input image 1602, and extract features to determine a global tone curve 1606 using a GTM specific neural network 1604. At block 1608, the system applies the global tone curve 1606 to the image 1602 to produce a globally tone-mapped image 1610. The system extracts features from the image 1610 to generate local tone curves 1614 using an LTM specific neural network 1612. At block 1616, the system applies the local tone curves to the image 1610 to produce the locally tone-mapped image 1618. Alternatively, the system may apply the local tone curves first, and then apply a global tone curve.

In addition to automatic local tone mapping, the system may be utilized in an interactive setting and integrated with photo-editing software. The system may be utilized by users to produce an automatically enhanced image, and then manually enhance a local region of the image by modifying the local tone curve corresponding to that region.

After producing a locally tone-mapped image, a user may select a point $\hat{y}(i,j)$ on the image to modify the portion containing the point. The tone curve applied at location (i,j) may be a weighted average of tone curves predicted at the nearest portion centers. With (i,j) located in the center region, the tone curve applied at (i,j) may be determined as in Equation (9):

$$\tilde{t}_{ij} = \sum_{k=1}^{4} w_{ijk} t_k \tag{9}$$

where $t_k$ represents the four surrounding curves, and $w_{ijk}$ represents the weight given to a component tone curve at location (i,j) that is inversely proportional to its distance from point (i,j).

The user may define a target tone curve at location (i,j). The user may select from a set of preset tone curve, using the cumulative distribution function of the selected region, and use a self-defined LUT. The target tone curve may be treated as a scaled version of $\tilde{t}$, as in Equation (10):

$$t^*_{ij} = s \odot \tilde{t}_{ij} \tag{10}$$

where elements of s are the scaling factors transforming each entry in $\tilde{t}$ to the target tone curve entry. Given a target tone curve, the system may determine the scaling factors by element-wise division of the target tone curve t* by the original tone curve $\tilde{t}$.

The tone curves predicted at the nearest portion centers (i.e., $t_k$, $k \in \{1, \ldots, 4\}$), may be modified so that their interpolated result matches with the target tone curve. The edited image $\tilde{y}$ may be obtained by applying Interp(x, $\tilde{\mathcal{T}}$) to the tone curve set $\tilde{\mathcal{T}}$ that includes edited tone curves.

Figure 17:
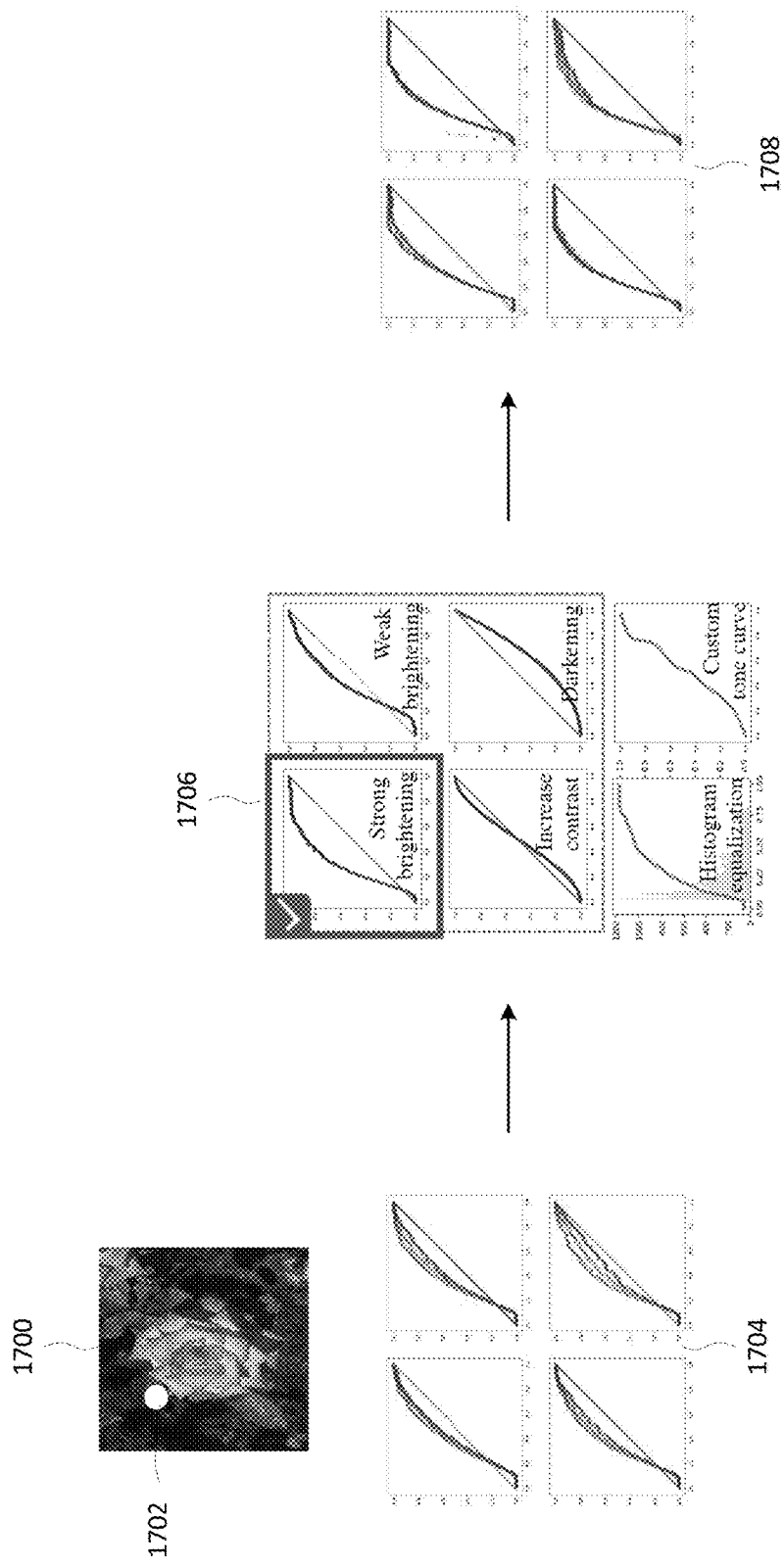
FIG. 17 is a diagram of interactive editing of tone curves, according to an embodiment.

FIG. 17 is a diagram of interactive editing of tone curves, according to an embodiment. A user may be presented with an image, such as image 1700. The user may select a point 1702 on the image. The system may then identify the neighboring determine tone curves at the point 1702, such as tone curves 1704. The system may present the user with a user interface 1706 for selecting a tone curve adjustment. For example, the tone curve adjustment selections may include strong brightening, weak brightening, increasing contrast, darkening, histogram equalization, custom tone curve adjustments, etc. As shown in 1706, the strong brightening option is selected. Then, the system may apply the selected tone curve adjustment to the neighboring tone curves 1704, as shown in adjusted tone curves 1708.

Figure 18:
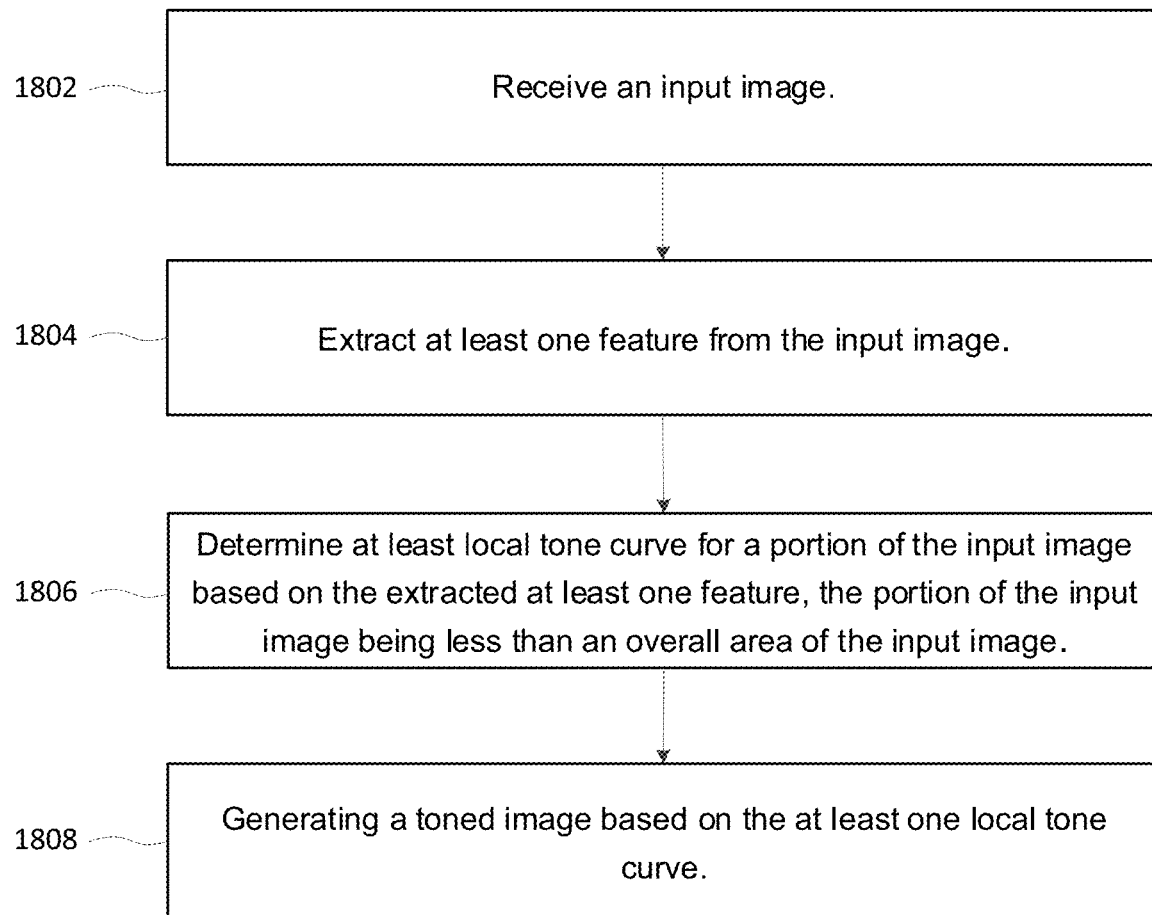
FIG. 18 is a flowchart of a method for generating toned images, according to an embodiment.

FIG. 18 is a flowchart of a method for generating toned images, according to an embodiment. In operation 1802, the system receives an input image. In operation 1804, the system extracts at least one feature from the input image. In operation 1806, the system determines at least local tone curve for a portion of the input image based on the extracted at least one feature, the portion of the input image being less than an overall area of the input image. In operation 1808, the system generates a tone image based on the at least one local tone curve.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   receiving an input image;
   extracting at least one feature from the input image;
   partitioning at least a portion of the input image into a plurality of neighboring tiles,
   partitioning the plurality of neighboring tiles into a center region comprising portions of a first number of the plurality of neighboring tiles, and a non-center region comprising at least a portion of a second number of the plurality of neighboring tiles, the second number being less than the first number;

determining a plurality of local tone curves respectively for each of the plurality of neighboring tiles based on the extracted at least one feature; and generating a toned image based on at least one local tone curve of the plurality of local tone curves, wherein generating the toned image based on the at least one local tone curve comprises:

based on a pixel being in the non-center region, applying each local tone curve for each tile of the second number of the plurality of tiles to the pixel.

2. The method of claim 1, wherein the at least one local tone curve comprises a plurality of one-dimensional look-up tables (LUTs) for each color channel.

3. The method of claim 1, wherein the portion of the input image comprises a plurality of pixels of the input image.

4. The method of claim 1, wherein the at least one local tone curve is constrained to be non-decreasing.

5. The method of claim 1, wherein generating the toned image comprises applying the at least one local tone curve to a border region of the portion of the input image.

6. The method of claim 1, further comprising determining a pixel weight map of the input image.

7. A system, comprising:
a memory storing instructions; and
a processor configured to execute the instructions to:
receive an input image;
extract at least one feature from the input image;
partition at least a portion of the input image into a plurality of neighboring tiles;
partition the plurality of neighboring tiles into a center region comprising portions of a first number of the plurality of neighboring tiles, and a non-center region comprising at least a portion of a second number of the plurality of neighboring tiles, the second number being less than the first number;
determine a plurality of local tone curves respectively for each of the plurality of neighboring tiles based on the extracted at least one feature; and
generate a toned image based on at least one local tone curve of the plurality of local tone curves,
wherein the processor is configured to execute the instructions to generate the toned image based on the at least one local tone curve by:
applying each local tone curve for each tile of the second number of the plurality of tiles to a pixel based on the pixel being in the non-center region.

8. The system of claim 7, wherein the at least one local tone curve comprises a plurality of one-dimensional look-up tables (LUTs) for each color channel.

9. The system of claim 7, wherein the portion of the input image comprises a plurality of pixels of the input image.

10. The system of claim 7, wherein the at least one local tone curve is constrained to be non-decreasing.

11. The system of claim 7, wherein the processor is further configured to execute the instructions to generate the toned image comprises applying the at least one local tone curve to a border region of the portion of the input image.

12. The system of claim 7, wherein the processor is further configured to execute the instructions to determine a pixel weight map of the input image.

13. A non-transitory computer-readable storage medium storing instructions that, when executed by at least one processor, cause the at least one processor to:
receive an input image;
extract at least one feature from the input image;
partition at least a portion of the input image into a plurality of neighboring tiles;
partition the plurality of neighboring tiles into a center region comprising portions of a first number of the plurality of neighboring tiles, and a non-center region comprising at least a portion of a second number of the plurality of neighboring tiles, the second number being less than the first number;
determine a plurality of local tone curves respectively for each of the plurality of neighboring tiles based on the extracted at least one feature; and
generate a toned image based on at least one local tone curve of the plurality of local tone curves,
wherein the instructions, when executed, further cause the at least one processor to generate the toned image based on the at least one local tone curve by:
applying each local tone curve for each tile of the second number of the plurality of tiles to a pixel based on the pixel being in the non-center region.

14. The storage medium of claim 13, wherein the at least one local tone curve comprises a plurality of one-dimensional look-up tables (LUTs) for each color channel.

15. The storage medium of claim 13, wherein the portion of the input image comprises a plurality of pixels of the input image.

16. The storage medium of claim 13, wherein the at least one local tone curve is constrained to be non-decreasing.

17. The storage medium of claim 13, wherein the instructions, when executed, further cause the at least one processor to generate the toned image comprises applying the at least one local tone curve to a border region of the portion of the input image.

* * * * *